United States Patent
Cahill et al.

(10) Patent No.: US 9,736,580 B2
(45) Date of Patent: Aug. 15, 2017

(54) ACOUSTIC CAMERA BASED AUDIO VISUAL SCENE ANALYSIS

(71) Applicant: INTEL CORPORATION, Santa Clara, CA (US)

(72) Inventors: Niall Cahill, Galway (IE); Hugh M. Carr, County Wicklow (IE); Mark Y. Kelly, Leixlip (IE); Keith Nolan, Mullingar (IE); Aurelian V. Lazarut, Athy (IE); Keith A. Ellis, Carlow (IE); Ronan J. O'Malley, County Mayo (IE)

(73) Assignee: INTEL CORPORATION, Santa Clara, CA (US)

( * ) Notice: Subject to any disclaimer, the term of this patent is extended or adjusted under 35 U.S.C. 154(b) by 88 days.

(21) Appl. No.: 14/662,880

(22) Filed: Mar. 19, 2015

(65) Prior Publication Data

US 2016/0277863 A1     Sep. 22, 2016

(51) Int. Cl.
*H04R 5/00* (2006.01)
*G09F 27/00* (2006.01)
(Continued)

(52) U.S. Cl.
CPC ............... *H04R 3/005* (2013.01); *G01S 3/80* (2013.01); *G01S 3/801* (2013.01); *G01S 3/8083* (2013.01)

(58) Field of Classification Search
CPC .... H04R 29/00; H04R 29/005; H04R 29/008; H04R 5/00; H04R 5/027; H04R 3/005; G06F 3/165
(Continued)

(56) References Cited

U.S. PATENT DOCUMENTS

| 7,289,633 | B2 | 10/2007 | Metcalf |
| 8,867,891 | B2 | 10/2014 | Jiang et al. |

(Continued)

FOREIGN PATENT DOCUMENTS

| CN | 102404667 A | 4/2012 |
| CN | 102405495 B | 8/2014 |

(Continued)

OTHER PUBLICATIONS

Oh, KR20100013347A, 2010.*
(Continued)

*Primary Examiner* — William A Jerez Lora
(74) *Attorney, Agent, or Firm* — Finch & Maloney PLLC

(57) ABSTRACT

Techniques are disclosed for scene analysis including the use of acoustic imaging and computer audio vision processes for monitoring applications. In some embodiments, an acoustic image device is utilized with a microphone array, image sensor, acoustic image controller, and a controller. In some cases, the controller analyzes at least a portion of the spatial spectrum within the acoustic image data to detect sound variations by identifying regions of pixels having intensities exceeding a particular threshold. In addition, the controller can detect two or more co-occurring sound events based on the relative distance between pixels with intensities exceeding the threshold. The resulting data fusion of image pixel data, audio sample data, and acoustic image data can be analyzed using computer audio vision, sound/voice recognition, and acoustic signature techniques to recognize/identify audio and visual features associated with the event and to empirically or theoretically determine one or more conditions causing each event.

22 Claims, 8 Drawing Sheets

(51) Int. Cl.
*H04R 3/00* (2006.01)
*G01S 3/80* (2006.01)
*G01S 3/801* (2006.01)
*G01S 3/808* (2006.01)

(58) Field of Classification Search
USPC ........ 381/26, 56, 58, 91, 122, 124, 306, 333
See application file for complete search history.

(56) References Cited

U.S. PATENT DOCUMENTS

| | | |
|---|---|---|
| 2006/0029242 A1 | 2/2006 | Metcalf |
| 2010/0257129 A1 | 10/2010 | Lyon et al. |
| 2011/0102570 A1* | 5/2011 | Wilf ................ G06F 3/017 348/77 |
| 2012/0027217 A1 | 2/2012 | Jun et al. |
| 2012/0116761 A1* | 5/2012 | Wang ................ G10L 21/06 704/235 |
| 2012/0268424 A1* | 10/2012 | Kim ................ G06F 3/017 345/175 |
| 2013/0089303 A1 | 4/2013 | Jiang et al. |
| 2013/0272095 A1 | 10/2013 | Brown et al. |
| 2013/0272548 A1* | 10/2013 | Visser ............ G06K 9/00624 381/122 |
| 2014/0180673 A1* | 6/2014 | Neuhauser ........... G10L 19/018 704/9 |
| 2015/0100290 A1* | 4/2015 | Falt ................ A61N 5/1075 703/2 |
| 2016/0034786 A1* | 2/2016 | Suri ................ G06K 9/6256 382/159 |
| 2016/0110794 A1* | 4/2016 | Hsiao ............... G06K 9/6256 705/26.7 |

FOREIGN PATENT DOCUMENTS

| | | |
|---|---|---|
| CN | 104246796 A | 12/2014 |
| KR | 20100013347 A * | 2/2010 |
| KR | 1020100013347 A | 2/2010 |

OTHER PUBLICATIONS

Hal, The Acoustics of Performance Spaces, 2012.*
International Search Report and Written Opinion received for Application No. PCT/US2016/018387, dated Jun. 13, 2016. 14 pages.
TW Office Action and Search Report of R.O.C. Patent Application No. 10510076, dated Oct. 28, 2016, 14 pages total (1 page of English Translation, 13 pages of original document).

* cited by examiner

ACOUSTIC CAMERA BASED AUDIO VISUAL SCENE ANALYSIS

BACKGROUND

An acoustic camera is a device that can be used to render a visual representation of the sound energy in a scene. The result of this visualization is sometimes referred to as an acoustic image or an acoustic mapping. Similar to an image produced by a standard camera, an acoustic image is a 2-D grid of pixels. But, unlike light-based images in which pixels correspond to light modalities within a scene, pixels in acoustic images correspond to the intensities of sound emanating within a scene. In some cases, signal processing techniques in combination with a 1-D array of microphones can be utilized, wherein each pixel of an output image represents the sound intensity from a unique angle of arrival as captured at each spatial point by microphones of the 1-D array. One such example technique is beamforming, also known as spatial filtering. Beamforming includes delaying each microphone signal relatively and adding them. As a result, the signal coming from a particular direction is amplified (e.g., is in phase) while signals coming from other directions (angles) are attenuated or otherwise mitigated. The intensity of the resulting signal can then be calculated and mapped such that a pixel corresponding to the angle (or direction) of arrival reflects the power of the signal.

Figure 1:
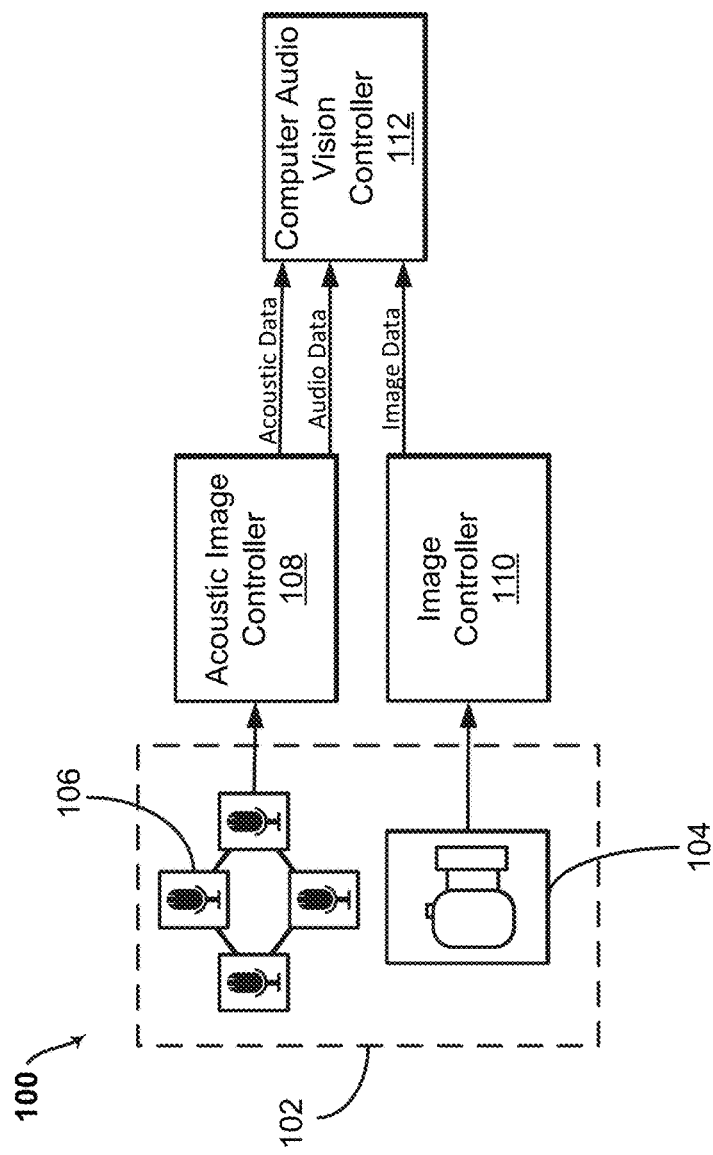
FIG. 1 illustrates a block diagram of an acoustic monitoring system in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Techniques are disclosed for scene analysis including the use of acoustic imaging and computer audio vision (CAV) processes for visual monitoring and inspection applications. In particular, a monitoring system configured in accordance with an embodiment of the present disclosure includes an acoustic camera operatively coupled with a CAV stage. The acoustic camera is used to register sound variations, referred to herein as sound events, occurring within an observed scene, and the CV-stage is configured to analyze and intelligently classify one or more conditions (causes) giving rise to those sound events. A sound variation may include, for example, the case where a sound is introduced (e.g., silence→sound, or sound1→sound1+sound2), an existing sound changes (e.g., sound gets louder or softer), a first sound changes to a second sound (e.g., sound1→sound2), a sound is removed (e.g., sound→silence, or sound1+sound2→sound1), and any other event associated with a change in the current sound domain. In any such cases, a CAV-enhanced acoustic monitoring system can be used to associate sound events with identified objects in an observed scene, and to leverage that association to relate one or more causes or conditions giving rise to those events. The techniques are based in recognition that in certain environments it is beneficial to localize and identify the sources of sound, such as during condition monitoring of industrial equipment. For example, monitoring ongoing acoustic events for industrial equipment enables the operating modes of that machinery to be better understood such that deviations from normal or otherwise expected operation can be used to identify, for instance, a fault occurring or opportunities for preventative maintenance, as the case may be. In some embodiments, a controller is configured to receive scene data including image frames, acoustic image frames, and a plurality of spatially filtered audio samples. The controller can receive this scene data in real-time, or near real-time, as a scene is observed, or can process scene data that was previously captured. In any such cases, the controller includes an event recognition mode configured to detect variations in the spatial spectrum of a scene (e.g., through acoustic images) indicative of sound events, and isolate a region of acoustic image and image pixels correlated to each event. These correlated regions can also include audio content for each event, wherein the audio content results from spatial filtering such that only those sound signals giving rise to the event are most prominent or otherwise clearly audible in the audio content. To this end, and in accordance with an embodiment, each event in the monitoring system's field of view (FOV) can be quantified by way of data fusion, wherein a multi-dimensional event signature effectively results from a fusion of light image data, acoustic image data, and audio data. In an embodiment, these event signatures or event "finger prints" can be compared to other such event signatures (e.g., utilizing acoustic and image signature techniques), previously classified or otherwise derived a priori, to classify probable conditions giving rise to the events. As will be appreciated in light of this disclosure, such a system can enable accurate scene analysis and condition monitoring in complex sound environments, particularly those environments characterized by the presence of noise and other interferences. As will be further appreciated, the techniques can be implemented in various electronic devices capable of capturing or otherwise receiving captured sound and image data including, for example, smart phones, wearable computers, laptops, tablets, system-on-chip configurations, or other electronic devices that could be utilized for scene monitoring and analysis. As will be further appreciated, example embodiments may be implemented in hardware, software, firmware, or any combinations thereof.

General Overview

As previously discussed, localizing and identifying the sources of sound can be beneficial, such as in industrial environments. For instance, a change in the operating mode of a machine is often accompanied by a distinctive audible change, visual change, or a combination of both, with each such change indicative of actionable information if properly identified. One such specific example includes Heating, Ventilation and Air Conditioning (HVAC) machines, such as chillers which emanate different sounds by various subsystems and their associated cycles (e.g., cooling stage, dwell stage, heating stage, etc). Such sounds can indicate both normal states and abnormal states. Often, such analysis is left entirely, or in part, to human beings to hear, recognize and react to. However, what sounds "normal" to an untrained/inexperienced ear could sound abnormal to an expert's ear. Unfortunately, such expert knowledge is expensive to obtain and is a skillset that requires time, investment, and training. In addition, many production environments are particularly noisy places making it difficult to pinpoint the source of a sound and to hear that sound clearly, even if one is trained in this manner. There are monitoring systems on the market today which utilize acoustic imagery to help compensate for these issues. However, these solutions involve manual interaction and interpretation by a technician. In addition, some of these solutions are limited in that multiple simultaneous sounds, typical of real-world environments, can overlap and prevent or otherwise complicate accurate scene analysis. For this reason, existing solutions typically ignore sound altogether or consider it a secondary aspect.

Thus, and in accordance with an embodiment of the present disclosure, techniques are disclosed enabling accurate scene analysis for condition monitoring in complex sound environments. In particular, an acoustic monitoring system can be used to detect changes in the sound field that are indicative of events in an environment, and isolate each event to classify the cause or condition giving rise to the same. Some such example environments include both industrial and non-industrial environments including, for instance, urban environments, military environments, home environments, and disaster zones, just to name a few. In any such cases, the acoustic monitoring system can be a combination of hardware and software implemented in, or otherwise integrated, within an electronic device including, for example, mobile electronic devices (e.g., laptop, smart phone, wearable computer), fixed-position systems (e.g., desktop computing systems, computer-aided CCTV or camera surveillance systems, distributed computing systems operatively coupled via a communication network), or other computer-based devices and systems. Note, that these techniques are not limited to real-time scene analysis as they can be utilized to analyze scene data that was previously captured to perform retrospective event detection and classification. In addition, such retrospective analysis can include updating event classification models and/or configuration changes (e.g., thresholds values and detection sensitivity) to increase overall analysis accuracy. Moreover, the analysis can be performed locally or remotely, with respect to the area being monitored.

One specific example embodiment can be implemented at least partly within a computing device to provide an acoustic monitoring system that alerts the user to potential fault conditions within a machine or to otherwise monitor machine condition. In one such embodiment, the acoustic monitoring system can be configured to capture audio and video for a scene in a continuous mode (e.g., always-on, always capturing), or a periodic mode (e.g., every few seconds, on a schedule, or otherwise delayed). In addition, the acoustic monitoring system can be configured in an on-demand mode whereby a user initiates capture by selecting a user interface option or hardware button. In some such example cases, for instance, the computing device can include or otherwise be communicatively coupled to an array of microphones (e.g., a 2-D array of microphones) and an image sensor to perform capturing of sound and image data. In addition, the computing device can include or otherwise be communicatively coupled to an acoustic image controller configured to generate acoustic image data based on the captured audio. In an embodiment, captured audio is processed by the acoustic image controller and is transformed into a 2-D grid of pixels representing the spatial spectrum of the captured scene. During capture, the 2-D grid of acoustic image pixels can be optionally visualized by a user interface (e.g., on a display of a computing device), and in one such example case can be depicted as an overlay on to one or more displayed images of the target/observed scene. As will be appreciated, such an overlay effectively correlates audio data from the monitoring system's field of view (FOV) to visual data from the monitoring system's FOV. Some such example visualizations include so-called "hotspot" or heat map representations that help to visualize sound intensities, and identify the position from which the sound is emanating (e.g., angle of arrival). As will be appreciated in light of this disclosure, these hotspots can be utilized to the extent that each cluster (region) of pixels is a distinct sound event from the audio domain of the scene, and can be used to localize and isolate corresponding pixels of image data (e.g., containing the object or location from which the sound is emanating from) from the visual domain of the scene. To this end, the FOV of the monitoring system effectively allows a rich data set to be captured that includes components from both the audio domain and the visual domain, in accordance with an embodiment. In addition, these hotspots can be utilized to sum or otherwise amplify sound signals that were spatially filtered to generate the acoustic image data. As will be further appreciated in light of this disclosure, such a combination of isolated/amplified sound signals, acoustic image data, and image data (e.g., light images) can enable a multi-dimensional event signature for each event, and that signature that can be compared to other pre-stored event signatures (or models) to classify a condition or cause giving rise to each event.

In an embodiment, the acoustic monitoring system can provide an alert message to the user that indicates at least one of one or more detected events, one or more determined classifications for the event, and supplemental data (sound event information) associated with the events. For example, if the acoustic monitoring system has observed a sputter machine in a production facility, the acoustic monitoring system could detect that a solenoid is malfunctioning or otherwise in an abnormal state based on registering the distinct sound emanating from the solenoid. In addition, such analysis can include visually confirming (e.g., using object recognition) the machine is of a type that includes solenoids, thus increasing the certainty and accuracy of the sound recognition. In this example, such an event can be classified and used to generate an alert message. Some such examples of an alert message include, a text or email message, a pop-up window, or an audible chime that the user has previously associated with the acoustic monitoring application (e.g., a series of beeps indicates a machine fault or abnormal condition). Another example alert is an aural presentation of the alert, such as pre-recorded expression via a speaker of the electronic device implementing the acoustic monitoring system, that an event has been detected and classified in an observed scene (e.g., "A solenoid is operating abnormally in sputter machine 1. A report has been emailed to you."). Another example alert is a haptic response (e.g., vibration of device) provided by a piezoelectric actuator or some other suitable element. Numerous communication schemes can be used to convey the alert, as will be appreciated.

In an embodiment, the alert message may be presented in an augmented reality mode, wherein the alert message is overlaid on to an image or images (without or without acoustic image overlays) of an observed scene. In addition, the alert message may be presented within such displayed images at a position which corresponds to the machine/object from which a sound emanated from. It should be appreciated that these techniques are not limited to presenting such alert messages on to live/captured images. For instance, a generated image of a machine (e.g., a 3-D wireframe, cutaway, or other representation) can be provided with an indication of the position of the detected event (including classification labels and other supplemental data) so as to enable an enhanced perspective on the condition causing the event. In a more general sense, once objects in an environment have been identified, a range of presentation options exist, including both real and generated, in order to more precisely communicate a detected condition to a user.

Another specific example embodiment is a distributed acoustic monitoring system, such that different nodes of the system include scene data acquisition and/or scene analysis techniques as disclosed herein. For instance, in one specific example case, one or more acoustic monitoring systems, acoustic cameras, and microphone arrays, as provided herein, can be distributed or otherwise deployed on a communication network. So, the distributed acoustic monitoring system can provide distributed scene data acquisition nodes that can provide audio, video and acoustic image data to a central location or to an entity capable of accessing the information from these node(s). Such an embodiment may be implemented, for example, in the context of so-called Internet of Things (IoT) configuration to provide the one or more scene data acquisition nodes communicatively coupled to one or more analysis nodes, or other such distributed acoustic monitoring systems. Further note that in such an IoT system, such devices can be integrated in a fixed-position node arrangement (e.g., closed-circuit television (CCTV), inspection cameras, surveillance cameras, and so on) deployed at a particular location and need not necessarily be mobile.

System Architecture

FIG. 1 illustrates an acoustic monitoring system 100 configured in accordance with an embodiment of the present disclosure. As can be seen, the system 100 includes scene (data) acquisition devices 102, an acoustic image controller 108, an image controller 110, and a computer audio vision (CAV) controller 112. As will be appreciated in light of this disclosure, the data acquisition devices 102, acoustic image controller 108, and image controller 110 are configured with spatially aligned capture domains (e.g., common field of view) to generate spatially and temporally aligned video and audio data for processing and subsequent scene analysis by the CAV controller 112, in accordance with an embodiment of the present disclosure. Note that spatial and temporal alignments may be performed by the CAV controller 112 in hardware, software, or any combination thereof. In addition, the CAV controller 112 may execute various post-processing routines to perform spatial and temporal alignments (e.g., versus an acoustic image device performing such alignment). In various embodiments, one or more of the components shown in system 100 may be fully integrated and implemented within a single chip (e.g., a system-on-chip, application-specific integrated circuit (ASIC), field-programmable gate array (FPGA), or other suitable logic device), or in other embodiments, integrated in one or more separate chips and communicatively coupled to implement techniques variously disclosed herein.

As shown, data acquisition devices 102 include an image sensor 104. Image sensor 104 may be implemented as any type of sensor capable of capturing light and converting it into a proportional electrical signal including, for example, CMOS, CCD and hybrid CCD/CMOS sensors. Some such example sensors include, for instance, color image data (RGB), color and depth image data (RGBD camera), depth sensor, stereo camera (L/R RGB), YUV, infrared signals, and x-rays. Although a single image sensor 104 is depicted in FIG. 1, it should be appreciated additional sensors and sensor types can be utilized (e.g., multiple cameras arranged to photograph a scene from different perspectives) without departing from the scope of the present disclosure. To this end, image sensor 104 can be implemented as a number of different sensors depending on a particular application. For example, image sensor 104 may include a first sensor being an infrared detector, and a second sensor being a color-image sensor (e.g., RGB, YUV). In other examples, image sensor 104 may include a first sensor configured for capturing an image signal (e.g., color image sensor, depth-enabled image sensing (RGDB), stereo camera (L/R RGB), YUV, infrared, and x-ray) and a second sensor configured to capture image data different from the first image sensor.

Figure 2:
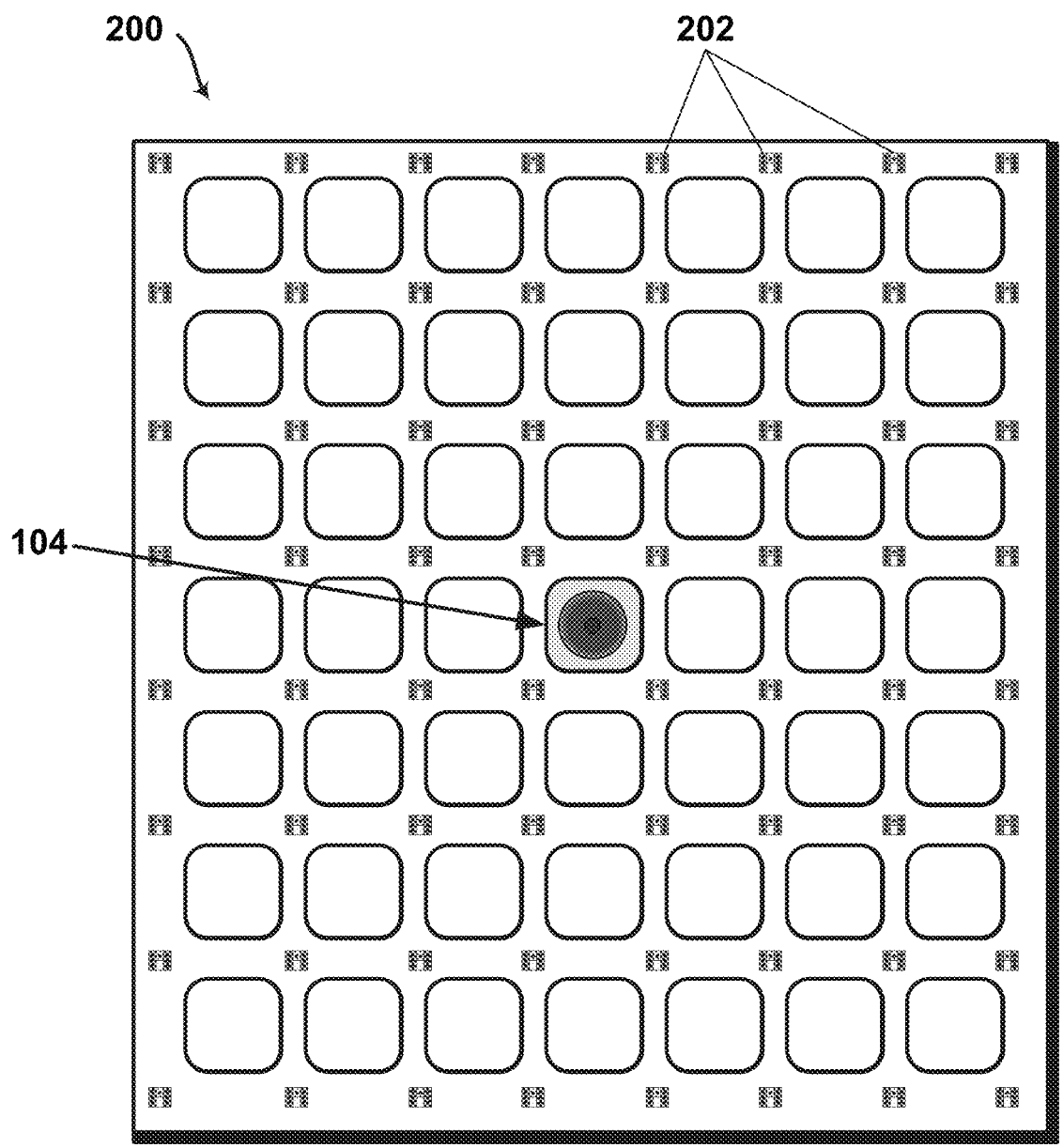
FIG. 2 illustrates an example 2-D microphone array with a spatially aligned image sensor, in accordance with an embodiment of the present disclosure.

As further shown in the system 100, data acquisition devices 102 include a microphone array 106. The microphone array 106 can be implemented as, for example, any number of microphones devices that can convert sound (e.g., acoustic pressures) into a proportional electrical signal. In the general context of the techniques discussed herein, the microphone array 106 is a 2-D microphone array having an M×N pattern of microphones, but other microphone array configurations will be apparent in light of this disclosure. One such example 2-D microphone array 200 is depicted in FIG. 2. As shown, an 8×8 microphone array 200 is depicted in a uniform linear array pattern. Each microphone 202 is positioned in a particular row and column and thus can be addressed individually within the array of microphones 200. It should be appreciated that in other embodiments, the microphone array 200 could be configured in different patterns such as, for example, circular, spiral, random, or other array patterns. Note that in the context of distributed acoustic monitoring systems, such as those discussed below with regard to FIG. 6, the array of microphones 200 may comprise a plurality of microphone arrays that are local or remote (or both local and remote) to the acoustic monitoring system 100.

Each microphone 202 of microphone array 200 can be implemented as, for example, a microphone device with an omnidirectional pickup response such that response is equal to sounds coming from any direction. In an embodiment the omnidirectional microphones can be configured to be more sensitive to sounds coming from a source perpendicular to the broadside of microphone array 200. Such a broadside array configuration is particularly well-suited for targeting sound sources in front of the microphone array 200 versus sounds originating from, for instance, behind the microphone array 200. Other suitable microphone arrays can be utilized depending on the application, as will be apparent in light of this disclosure. For example, end-fire arrays may be utilized in applications that require compact designs, or those applications that require high gain and sharp directivity. In other embodiments, each microphone 202 can comprise a bi-directional, unidirectional, shotgun, contact, or parabolic style microphone. As generally referred to herein, a contact microphone can enable detecting sound by having the microphone in contact or close proximity with an object (e.g., a machine, a human). For example, a contact microphone could be put in contact with the outside of a device (e.g., a chassis) where it may not be possible or otherwise feasible to have a line of sight with the target device or object to be monitored.

As shown in the example microphone array 200, each microphone 202 is comprised of identical microphone devices. One such specific example includes MEMS-type microphone devices. In other embodiments, other types of microphone devices may be implemented based on, for example, form factor, sensitivity, frequency response and other application-specific factors. In a general sense, identical microphone devices are particularly advantageous because each microphone device 200 can have matching sensitivity and frequency response to insure optimal performance during audio capture and beamforming (spatial) analysis. In an embodiment, microphone array 200 can be implemented within a housing or other appropriate enclosure. In some cases, the microphone array 200 can be mounted in various ways including, for instance, wall mounted, ceiling mounted and tri-pod mounted. In addition, the microphone array 200 can be a hand-held apparatus or otherwise mobile (non-fixed). In some cases, each microphone 202 can be configured to generate an analog or digital data stream (which may or may not involve Analog-to-Digital conversion or Digital-to-Analog conversion).

It should be appreciated in light of this disclosure that other types of microphone devices could be utilized and this disclosure is not limited to a specific model, or use of a single type of microphone device. For instance, in some cases it may be advantageous to have a subset of microphone devices with a flat frequency response and others having a custom or otherwise targeted frequency response. Some such examples of a targeted frequency response include, for instance, a response pattern designed to emphasize the frequencies in a human voice while mitigating low-frequency background noise. Other such examples could include, for instance, a response pattern designed to emphasize high or low frequency sounds including frequencies that would normally be inaudible or otherwise undetectable by a human ear. Further examples include a subset of the microphone array 200 having a response pattern configured with a wide frequency response and another subset having a narrow frequency response (e.g., targeted or otherwise tailored frequency response). In any such cases, and in accordance with an embodiment, a subset of the microphone array 202 can be configured for the targeted frequency response while the remaining microphones can be configured with different frequency responses and sensitivities.

Still referring to FIG. 2, the image sensor 104 is depicted in the center of the microphone array 200. In accordance with an embodiment, the center placement of the image sensor 104 spatially aligns the image capture domain (field of view) of the camera with the audio capture domain of the microphone array 200. In other embodiments, placement of the image sensor 104 is not limited to a center position. For example, the image sensor 104 can be positioned next to or otherwise in proximity of the microphone array 200 so long as a portion of the capture domains overlap, or can otherwise be correlated to one another in an overlapping fashion. In any such cases, a calibration routine or spatial registration process can be performed such that the capture domain of the image sensor 104 and the capture domain of the microphone array 200 are aligned to produce spatially aligned image and sound data, in accordance with an embodiment of this disclosure.

Returning to FIG. 1, the acoustic image controller 108 may be implemented, for example, as a Complex Instruction Set Computer (CISC) or Reduced Instruction Set Computer (RISC) processors, x86 instruction set processors, multi-core, microcontroller, an ASIC, or central processing unit (CPU). In some embodiments, the acoustic image controller 108 may comprise dual-core processor(s), dual-core mobile processor(s), and so on. The acoustic image controller 108 can include storage (not shown) such as non-volatile storage devices including flash memory and/or volatile storage devices such as Random Access Memory (RAM), Dynamic Random Access Memory (DRAM), and Static Ram (SRAM).

Image controller 110 may be implemented, for example, as a Complex Instruction Set Computer (CISC) or Reduced Instruction Set Computer (RISC) processors, x86 instruction set processors, multi-core, microcontroller, an ASIC, or central processing unit (CPU). In some embodiments, the image controller 110 may comprise dual-core processor(s), dual-core mobile processor(s), and so on. The image controller 110 can include storage (not shown) such as non-volatile storage devices including flash memory and/or volatile storage devices such as Random Access Memory (RAM), Dynamic Random Access Memory (DRAM), and Static Ram (SRAM). In an embodiment, the image controller 110 includes an image pipeline (not shown) including an image signal processor and one or more image enhancement stages for post-capture processing of image data. In an embodiment, the image controller 110 is utilized to control the camera of image sensor 104 to the extent necessary to initiate capture of image data with desired characteristics such as sharpness, noise, contrast, or any other desired image quality, as the case may be.

The CAV controller 112 may be implemented, for example, as a Complex Instruction Set Computer (CISC) or Reduced Instruction Set Computer (RISC) processors, x86 instruction set processors, multi-core, microcontroller, an ASIC, FPGA, SOC or central processing unit (CPU). In some embodiments, the CAV controller 112 may comprise dual-core processor(s), dual-core mobile processor(s), and so on. The CAV controller 112 can include storage (not shown) such as non-volatile storage devices including flash memory and/or volatile storage devices such as Random Access Memory (RAM), Dynamic Random Access Memory (DRAM), and Static Ram (SRAM). In some embodiments, the CAV controller 112 can include instructions or be otherwise programmed to cause the method 300, discussed below, to be carried out. To this end, process 300 may be implemented in hardware, software, firmware, or any combinations thereof.

In an embodiment, the system 100 may be embodied in varying physical styles or form factors. In some embodiments, for example, the system 100, or portions of it, may be implemented as a mobile computing device having wireless capabilities. A mobile computing device may refer to any device having a processing system and a mobile power source or supply, such as one or more batteries, for example. Some such examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

In use, the data acquisition devices 102 capture audio and video for an observed scene. As discussed above, such audio and video data is aligned spatially and temporally such that the capture domains of each overlap. Note that audio and video can be captured separately (e.g., by a separate camera and microphone array coupled to a monitoring system), and this disclosure should not be construed as limited in this regard. In some cases, the captured audio and video data is representative of a target scene such as, for example, fabrication equipment in a manufacturing facility, a city street, or other observable scene. These example use cases are provided for illustration and are not intended to limit this disclosure.

Figure 5A:
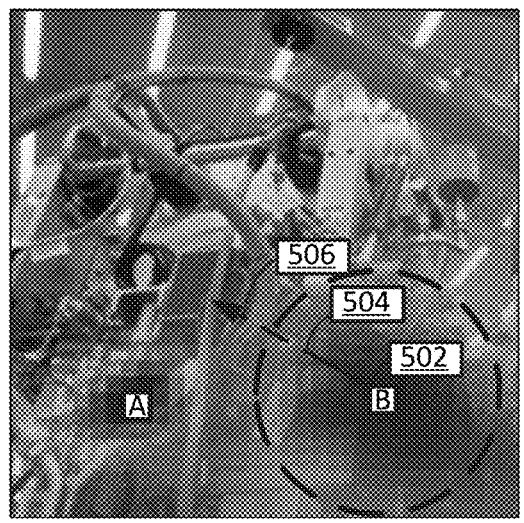
FIGS. 5A-5C depict various intermediate and resulting acoustic images generated as scene analysis is carried out by the example process flow of FIG. 4, in accordance with some embodiments of the present disclosure.

In an embodiment, the acoustic image controller 108 can be configured to generate acoustic image data based on spatially filtered audio signals (e.g., from the microphone array 200) in order to visually represent sound energy in an observed scene. As discussed above, acoustic images are similar in respect to standard images as they comprise a 2-D grid of pixels, but are different in that the intensity of the pixels corresponds to the intensities of sound emanating from a scene. To this end, pixel intensity of each pixel of a generated acoustic image frame represents sound intensity from each unique angle of arrival of sound (azimuth and elevation). In general, acoustic images are superimposed on to image frames of a same scene using a mask such as, for example, a semi-transparent colored heat map or other visible coloration. One such example image is depicted in FIG. 5A which depicts a sputter machine in a semiconductor fabrication environment. As shown, sound emanating from two fixed points of the sputter machine (in this case, points A and B) are represented with those regions of highest intensity (e.g., representing the angle of arrival) having pixels of a first color 502 (e.g., red). As sound is less intense at different angles of arrival, this difference in intensity is represented by pixels fading from the first color 502 to a second color 504 (e.g., red to yellow). In addition, further differences in sound intensity may be represented by pixels fading from the first color 502 to the second color 504 and then to a third color 506 (e.g., red to yellow, yellow to green). As shown, relative sound intensity is also indicated by the amount of transparency each colored pixel has. For instance, pixels closest to the angle of arrival (e.g., pixels colored/shaded within the region of the first color 502) are substantially opaque. In contrast, those pixels furthest from the angle of arrival include a nearly transparent mask. In any such embodiments, these colors and the transparency gradient applied may be user configurable. It should be appreciated the exact number of colors and the particular hues chosen are not particularly relevant to the present disclosure and should not be viewed as limiting. As will be discussed further below, these highlighted regions of sound intensity in an acoustic image frame allow for localization and isolation of sound sources in an observed scene, as well as analysis of the same to intelligently correlate sound with visual features within a scene, in accordance with some embodiments.

Methodology and Architecture

Figure 3:
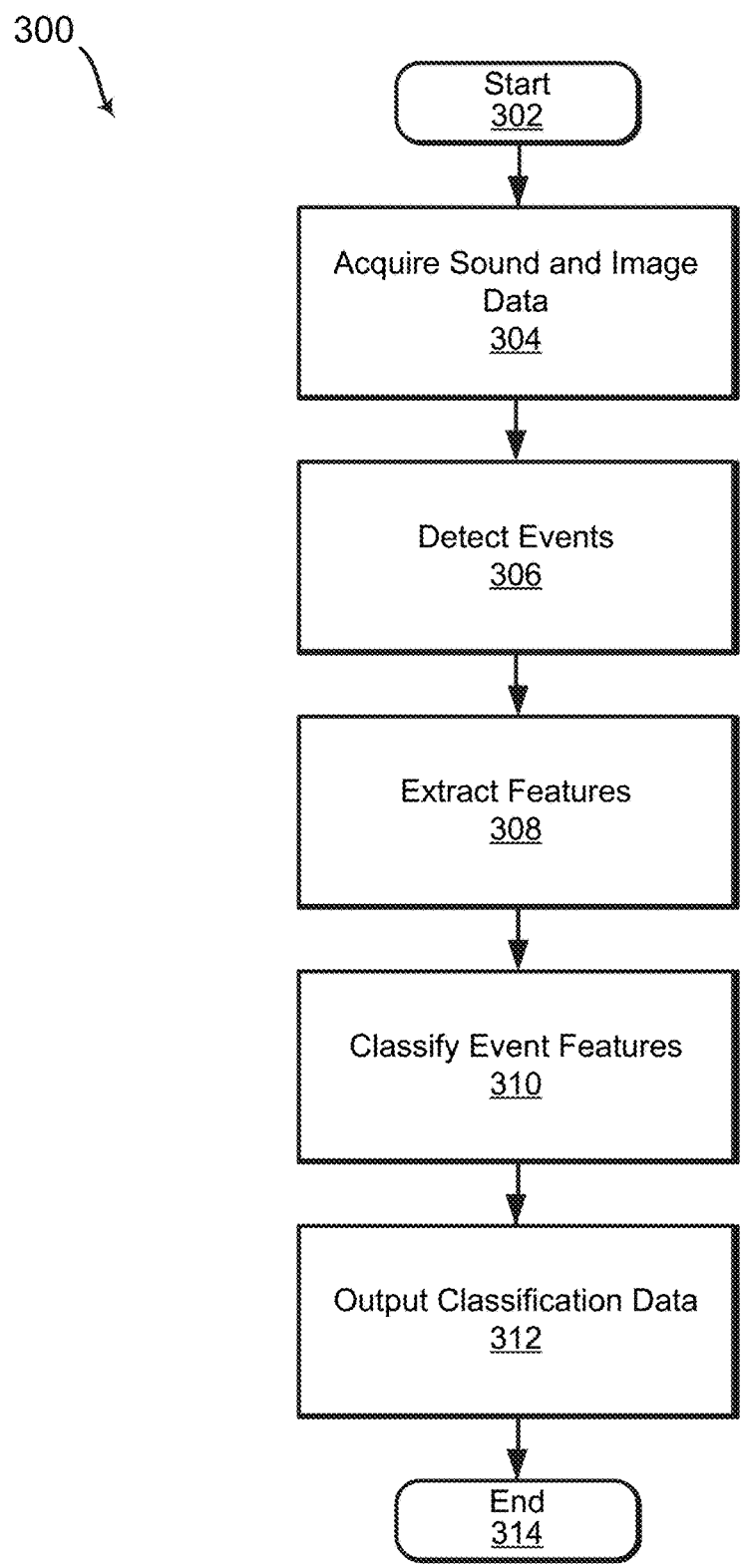
FIG. 3 illustrates an example methodology for scene analysis utilizing acoustic imaging and computer processing and analysis, in accordance with an embodiment of the present disclosure.
Figure 4:
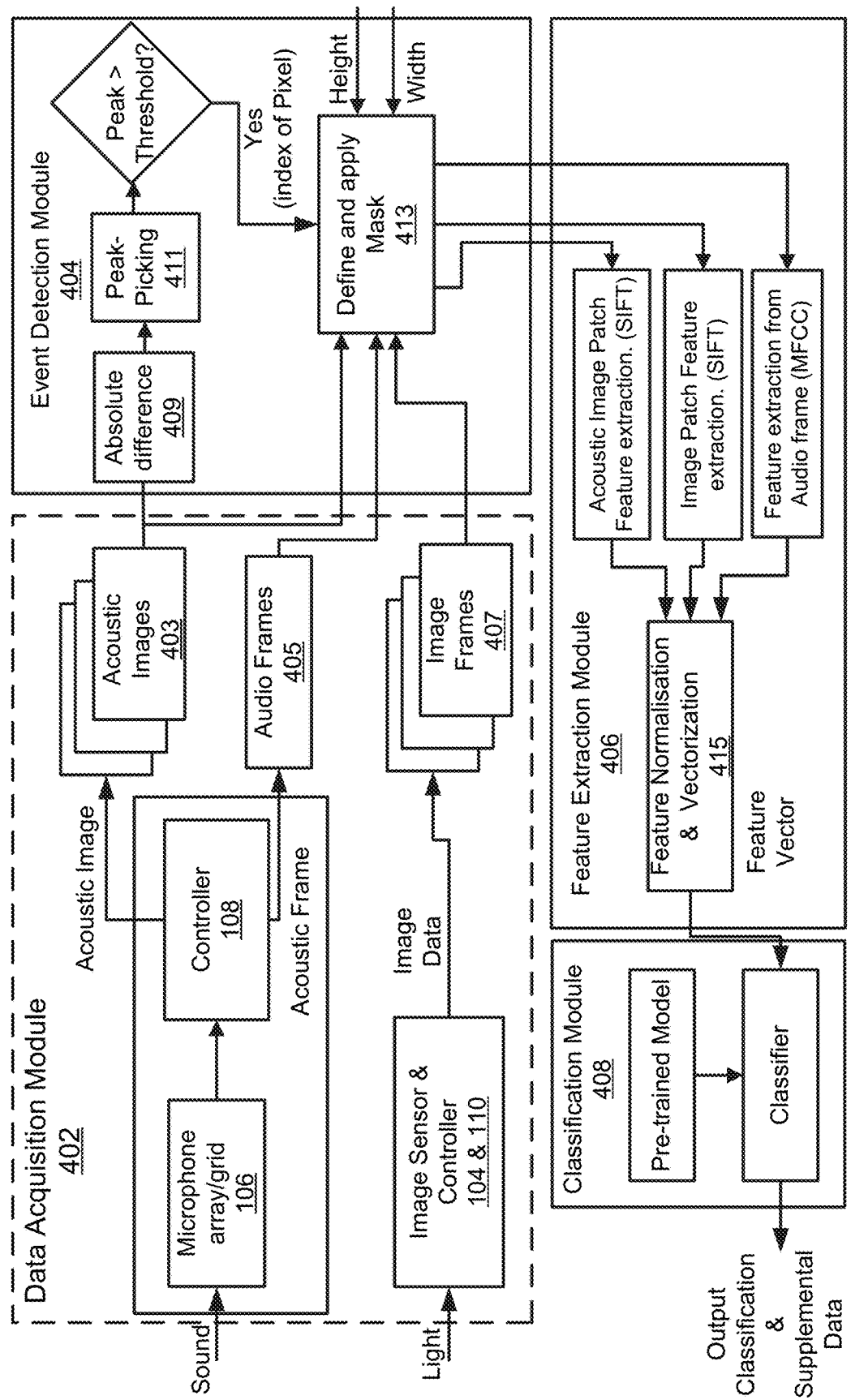
FIG. 4 illustrates an example process flow for the example methodology of FIG. 3, including a plurality of modules configured to detect and classify events within an observed scene, in accordance with an embodiment of the present disclosure.

FIG. 3 illustrates an example methodology 300 for analyzing acoustic images and sound to detect and classify events within an observed scene, in accordance with an embodiment of the present disclosure. This methodology may be implemented, for example, by the system 100 of FIG. 1, although numerous embodiments will be apparent in light of this disclosure. FIG. 4 through 5C illustrates an example process flow for the method 300 in addition to some example images that are generated as event analysis is carried out, in accordance with some embodiments. The example method 300 includes acts of acquiring 304 sound and image data of an observed scene to generate spatially and temporally aligned acoustic image and sound data, detecting 306 one or more events occurring within the aligned acoustic image, image data (light images) and sound data, extracting 308 features of the one or more detected events, and classifying 310 scene features to empirically or theoretically determine one or more conditions causing the events, and outputting 312 classification data. Method 300 begins in act 302.

As shown, the example method 300 includes an act of acquiring 304 sound and image data of an observed scene to generate spatially and temporally aligned acoustic, image and audio data streams. Referring to FIG. 4, the act of acquiring 304 sound and image data via data acquisition devices 102 is represented within the example process flow as data acquisition module 402. It should be appreciated that the data acquisition module 402 can be accurately referred to as a scene acquisition module, in some example embodiments, as the data acquisition module 402 can be configured to monitor a scene (including all objects therein) and not just one particular piece of equipment or object. Note that each of the modules 404, 406 and 408 may be implemented as hardware, software, or any combination thereof within the CAV controller 112. Further note, the CAV controller 112 may be configured to perform routines similar to those of the data acquisition module 402. Some such routines can include spatially aligning acoustic image(s) 403, audio frames 405 and image frame(s) 407, generating acoustic images and various signal processing related to signal processing of audio data (e.g., beamforming). As shown, the data acquisition module 402 comprises an acoustic image device configured to capture and provide acoustic images, image frames and audio data in real-time. It should be appreciated that data acquisition module 402 may be optional or configured differently to enable prospective scene analysis and condition monitoring. For example, the system 100 can be configured such that captured audio and video of a previously observed scene can be retrieved from an external location (e.g., a memory, a network location, or other storage location) and processed using the acoustic analysis techniques (e.g., through modules 404-408) variously disclosed herein. In addition, and in an embodiment, data acquisition module 402 may be implemented by two or more separate devices, with each device being configured to capture different aspects of the scene (e.g., a camera device to capture light images, an acoustic image controller to render sound intensities, and one or more external microphone arrays). To this end, the data acquisition module 402 shown in FIG. 4 should not be construed as limiting. Other implementations will be apparent in light of this disclosure, such as hybrid configurations wherein live analysis by system 100 can be switched to prospective analysis, if desired.

In the example embodiment shown in FIG. 4, data acquisition module 402 can implement beamforming or other suitable technique for spatially filtering frames of audio in order to generate a spatial spectrum (acoustic image data) of an observed scene. It should be appreciated that other techniques for spatial analysis other than beamforming can be utilized and are within the scope of the disclosure. While beamforming techniques can be advantageously used to generate both spatially filtered audio and an acoustic image, other similar techniques for spatial analysis do not generate spatially filtered audio. Instead, they create spatial spectrums (e.g., acoustic images). Two such techniques, for example, are known as Multiple Signal Classification (MUSIC) algorithm and estimation of signal parameters via rotational invariance techniques (ESPRIT). Such techniques can be used to generate high resolution acoustic images. To this end, these acoustic images can be used in addition, or as an alternative, to the acoustic images generated by beamforming techniques.

Although the example embodiments discussed below reference one specific implementation of so-called "delay-and-sum" or "zero-forcing" beamforming, other beamforming techniques will be apparent in light of this disclosure. For example, filter-and-sum and adaptive beamforming techniques can also be utilized. As previously discussed, acoustic imaging visualizes the origin as an intensity of sound waves based on varying pixel intensities relative to the sound pressure detected at a plurality of points (e.g., each spatial position of a microphone array). Within the context of the example microphone array 200 of FIG. 2, each microphone device 202 can be positioned at discrete points in a predefined area. To this end, superposition of all microphone signals from microphone array 200 enables the estimation of the sound pressure for each targeted spatial point, which translates to one or more pixels of the generated acoustic image. In order to focus or otherwise target a certain point in an observed scene, the microphone array 200 does not necessarily have to be physically moved. Instead, through applying a series of appropriate delays across the microphones and summing all signals from the same, a particular point in an observed scene (e.g., angle of arrival) can be focused on (e.g., steered to). This delay-and-sum technique essentially delays the signals from each microphone in such a way that all sound waves emanating from a target point in an observed scene are in-phase, and thus, when added together, amplify sound waves emanating from that target point. Those sound waves emanating from other (non-targeted) points in an observed scene are out of phase and, as a result, are attenuated.

By way of example, consider one specific example embodiment of data acquisition devices 102 implementing some such beamforming techniques. As shown in FIG. 2, the array of microphones 200 includes an 8×8 pattern of microphones in discrete positions in a linear array totaling 64 discrete spatial points to measure acoustic pressure. In this example embodiment, each microphone 202 has identical sensitivity and frequency response and is configured to produce a sound signal sampled at, for example, 16 kHz with a 16 bit word depth. In addition, the image sensor 104 can be configured to produce image frames having, for example, a 256×256 (65536 pixels) resolution. For the purpose of clarity and ease of computation, examples embodiments disclosed herein assume a 16 kHz audio sample rate and a 256×256 (65536 pixel) image frame, but it should be appreciated that other audio sampling rates and image resolutions could be utilized, as needed, and are within the scope of this disclosure. As discussed above, the microphone array 106 and the image sensor 104 are configured such that they align spatially. In addition, the microphone array 106 and the image sensor 104 can be aligned temporally based on a common clock or other timing scheme to insure the data streams are in sync (e.g., near real-time or achieved through post-processing routines).

During a first stage, and in accordance with an embodiment, the acoustic image controller 108 partitions sound signals from each microphone 202 of the microphone array 200 into overlapping contiguous frames having, for instance, 32 milliseconds of duration represented within 512 samples. A synchronous frame from each microphone 202 (e.g., 64 frames), is then processed by a beamforming algorithm within the acoustic image controller 108. The result of the beamforming algorithm is 65536 spatially filtered frames of audio 405 corresponding to each image frame captured by the image sensor 104. Stated differently, beamforming techniques can enable digital steering of captured audio signals via a spatial filter such that each of the 65536 unique angles of arrival corresponds to a filtered frame of audio.

During a second stage, and in accordance with an embodiment, acoustic images 403 are generated by computing the energy (intensities) in each of these audio frames 405 and converting the intensities into a 2-D grid to render a 256×256 image (e.g., 65535 pixels). The resulting acoustic images 403, corresponding audio frames 405 and image frames 407 are then provided to the event detection module 404.

With reference to FIG. 4, and with additional reference to FIG. 3, after the data acquisition module 402 generates data streams including the acoustic images 403, audio frames 405 and image frames 407, the method continues with detecting 306 events within these data streams. Referring to FIG. 4, detecting 306 events within data streams generated by the data acquisition module 402 is represented with the example process flow as event detection module 404. In a general sense, and in accordance with an embodiment, the event detection module 404 analyses the stream of acoustic images for the location of changes in the sound field that indicates or otherwise suggests events occurring in an observed scene.

In an embodiment, the event detection module 404 creates a stream of delta images by determining 409 an absolute difference between successive acoustic image frames 403. In some cases, delta images are generated based on calculating the squared distance between successive acoustic images. In other cases, other suitable image comparison routines can be utilized to generate delta images, as will be apparent in light of this disclosure. In any such cases, peaks in each delta image are determined based on comparing pixel values within delta images against threshold intensity values. In an embodiment, the threshold is user-configurable or otherwise predetermined and represents a minimum pixel intensity whereby delta pixel intensities exceeding that value are registered as related to events. To this end, when a delta pixel exceeds the threshold value, the index of the pixel is utilized to define and apply a mask 413 within image frames 407. In an embodiment, the applied mask 413 comprises a rectangular shape or other geometry (e.g., a circle, square, or other shape) that denotes the event region (or position), also referred to herein as a region of interest. The parameters regarding the applied mask 413 can be user-defined and can include, for example, line thickness, line color, corner rounding values, and line type (e.g., broken, continuous, or dotted lines). In addition, parameters such as height and width of the applied mask 413 can be predetermined and/or user-supplied.

Figure 5B:
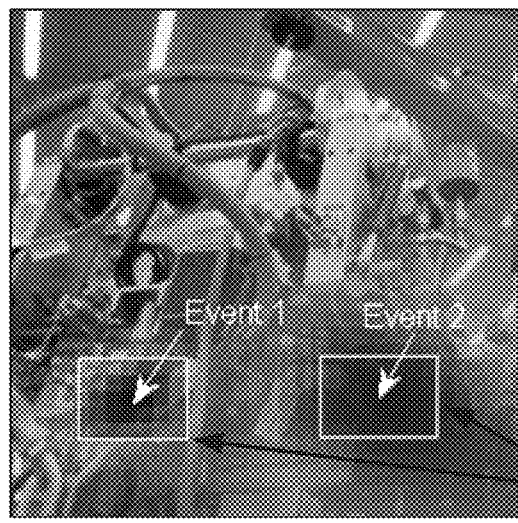
Figure 5C:
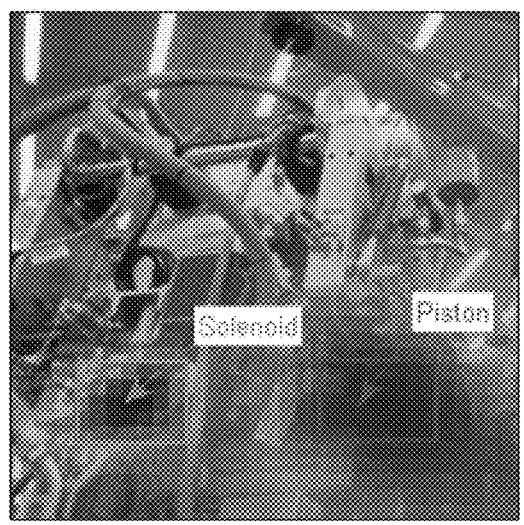

FIG. 5B depicts one example intermediate image frame output by the event detection module 404, in accordance with an embodiment of the present disclosure. As shown, the resulting image is a composite image comprising the image frame 407 (depicting fabrication equipment), the overlaid acoustic image frame 403, and the applied mask 413. Also as shown in the specific example of FIG. 5B, two different events (Event 1, Event 2) and corresponding event regions have been detected and denoted within the resulting image based on the applied mask 413. Within the context of this specific example, these two identified events correlate directly to sound emanating from the two distinct points within the observed scene. As discussed above, and in accordance with an embodiment, audio frames 405 and image frames 407 can be spatially and temporally registered (e.g., through a common point of view and/or an alignment routine). To this end, applying mask 413 enables the event detection module 404 to isolate/localize the corresponding portions of the image frame(s) 407 and the corresponding acoustic image frames(s) 403 for each respective event such that each event can be individually processed and classified, according to an embodiment. In an embodiment, the audio frames associated with each masked region 413 can be summed and averaged to render a frame of audio for each respective event. Other suitable techniques for audio signal processing may be utilized to render the frame of audio for each event, as will be apparent in light of this disclosure. In some cases, the correlated and isolated portions of acoustic image data and image data may be referred to as so-called "patches." In an embodiment, these patches of acoustic image data along with rendered audio frames for each event are provided to the feature extraction module 406.

With further reference to FIG. 3, after one or more events are detected by the event detection module 404, the method continues with extracting 308 features from isolated event regions/patches. Referring to FIG. 4, extracting 308 features from the isolated event regions is represented within the example process flow as feature extraction module 406. As shown, each portion of acoustic image data, image data, and audio frames are processed by a corresponding feature extraction routine. Each of these feature extraction routines will now be discussed in turn.

In an embodiment, visual features within regions/patches of both the acoustic image and the image data are analyzed via a scale invariant feature transform (SIFT) or other suitable routine for extracting salient/relevant features from images. In some cases, SIFT and SIFT-based derivative routines are particularly well-suited for compensating for small amount of movement due to, for instance, an unsteady hand holding a smart device comprising the system 100 or because of movements in the observed scene. The result of such SIFT processing includes object identification and a so-called "feature description" of the object. Each can be utilized to perform object recognition. As will be appreciated in light of this disclosure, such an approach is particularly advantageous as objects among clutter and partial occlusion can still be reliably identified.

In an embodiment, audio content from each event generated by the event detection module 404 can be analyzed to recognize sounds and/or to perform voice recognition. In an embodiment, audio content can be analyzed using Mel-frequency Cepstral coefficients (MFCCs) or other suitable sound-analysis routine as will be apparent in light of this disclosure. In an embodiment, MFCCs are particularly well-suited for a range of applications as MFCCs are typically used in both speech recognition and sound scene analysis.

In an embodiment, after visual and audio features have been extracted for each event in accordance with the feature extraction routines discussed above, the derived features are then sent to the feature normalization and vectorization module 415. In this embodiment, the extracted features (e.g., from acoustic image patches, image patches, and rendered audio frame) are combined and aggregated to create a feature vector for each detected sound event. In an embodiment, the feature vector may comprise one or more formats including, for example, binary data structures, XML, JSON, or other suitable machine readable format. As will be discussed below, this combination of acoustic image data, image data, and audio content form a multi-dimensional event signature that can be utilized by various techniques disclosed herein to perform sophisticated scene analysis. As should be appreciated, these techniques enable accurate scene analysis in complex sound environments, wherein two or more co-occurring sounds can be distinguished amongst a cacophony of interferences (background noise, non-critical noises, or any other ordinary or otherwise inconsequential noises). In an embodiment, the feature extraction module 406 then provides a feature vector for each event to the classification module 408.

With further reference to FIG. 3, after features are extracted 308 from each event, and a feature vector (multi-dimensional event signature) for each event is generated, the method continues with classifying 310 scene features to determine an event classification and associated meta data (supplemental data). Referring to FIG. 4, classifying 310 event features from a feature vector for each detected event is represented within the example process flow as classification module 408.

In an embodiment, the classification module 408 attempts to classify each event from a corresponding feature vector generated by the feature extraction module 406. In some cases, the classification is performed based on scoring the feature vector against a plurality of pre-trained models. More generally, the pre-trained models can comprise acoustic and visual signatures that allow sound events to be correlated (e.g., utilizing probability distributions) or otherwise classified to an event class. To this end, techniques variously disclosed herein utilize sound events and their particular characteristics to "finger print" each event, and utilize those fingerprints to empirically and/or theoretically determine a cause giving rise to those events. To this end, techniques variously disclosed herein advantageously fuse light data, acoustic image data and sound data. As will be apparent in light of this disclosure, other suitable machine-learning techniques may be utilized to construct and analyze such fingerprints. In addition, these generated fingerprints can be stored and utilized during subsequent analysis (e.g., for on-going training of the acoustic monitoring system 100).

In one specific example utilizing GMM-based machine learning, a 29 dimension GMM (13 dimensions for acoustic image, image and sound, respectively), can be predetermined for each event class a priori. In these cases, the pre-defined event models are configured during, for instance, manufacture of the device. In other cases, these pre-defined event models are learned or otherwise added to the system 100 over time through, for example, a training routine or through adding and/or updating models from an external location (e.g., a network server, a USB thumbdrive, or other location). In one such example case, the system 100 can present information to a user related to detected event (e.g., visual images of the event, sound samples from the event, or other isolated and extracted features), whereby a user can select a user interface feature to manually classify and store the event (e.g., as a GMM model) such that future occurrences of the same or otherwise similar event may be properly recognized in the future. In addition, the user can associate supplemental data with the stored event including, for example, manuals, notes, pictures, or any other related metadata. In any such cases, an Expectation Maximization (EM) algorithm can be used to compute parameters for each model. To this end, each feature vector can be passed to each GMM resulting in a score for each class, with the scores being normalized (e.g., to 1) across classes such that a posteriori probability distribution is generated for each event. Thus the system 100 can deduce one or more conditions for each event based on one or more of the highest scoring models.

As should be appreciated in light of this disclosure, the model classes can represent a wide variety of conditions characterized by their acoustic signatures including, for instance, machine component failure (e.g., a solenoid failing, an irregular compressor cycle, or other abnormal conditions). In addition, the model classes can represent various intermediate states occurring within such machines and can be used to deduce, for instance, the progress of an ongoing condition including whether a condition is likely to cause an immediate issue (e.g., critical state or high severity level) or whether the condition is indicative of some other stage of an issue (e.g., a stage that suggests future maintenance may be necessary, or the event is negligible or otherwise of a low severity). To this end, and in accordance with an embodiment, the system 100 can provide an early warning to potential problems within machinery to a user or other interested party (e.g., another computer or process). In addition, the system 100 can include user-defined settings that govern the relative sensitivity of event detection, whereby a user can fine-tune the minimum severity level of an event prior to propagating the event to a user.

It should be further appreciated that these models can be used to represent virtually any class of condition-related sounds (e.g., based on their acoustic and visual signatures) and are not necessarily limited to industrial machine monitoring, and sounds peculiar to that environment. For instance, the models could represent condition events such as vehicle-related noises in an urban environment (e.g., sound of exhaust, engine components, tires on pavement, and other such sounds), enemy movement/activity noises on a battlefield (e.g., mortar fire, gun shots, troop movements, vehicle movements, and so on), and indications of human life (e.g., a trapped victim) within a disaster zone, to name just a few.

In a more general sense, these models allow for each aspect/dimension of an event's signature to be taken into account so as to make an empirical or otherwise theoretical deduction as to what condition may be causing the sound event. For example, those aspects of the acoustic dimension of the event signature can be analyzed by each GMM to register similarities (e.g., such as between pixel intensities, pixel positions, and other acoustic similarities), and thus ultimately effect a resulting score. In other examples, other aspects and dimensions of the signatures can be combined and analyzed such that sound recognition and object identification each factor into the overall score. In addition, it should be appreciated that such sound recognition and object identification can be combined so as to provide context-aware understanding including, for instance, validating a recognized/identified sound based, in part, on confirming the identified object is capable of producing such a sound. In any such cases, if the score for each model utilized during classification exceeds a predetermined threshold for probability (e.g., 25%, 50%, and so on), the event vector is considered or is otherwise marked as related to the event model. In other embodiments, if the probability does not exceed the predetermined threshold, the event is ignored such that no alert or other indicator is displayed to a user (e.g., to mitigate false positives). Alternatively, those probabilities that do not exceed the predetermined threshold may be retained for future use by training routines and/or during other classification model refinements. Some such cases of when events could be ignored include not having a pre-stored model configured for the event. In addition, and other such cases, an event analyzed as indicative of normal operation of a machine may not be necessary to report to a user or to escalate the event for further action. In other embodiments, such events may not be ignored and could serve as a catalyst for a training routine, as discussed above, or to provide an indication to a user that machines/target scenes are operating within normal/expected parameters. In accordance with an embodiment, each event detected can result in a plurality of models scoring above the threshold. In this embodiment, each event can include a plurality of scores ordered relative to those models having the highest score, and thus, being the most likely condition causing the event.

With further reference to FIG. 3, after event classification 310, the method continues with outputting 312 classification data. In an embodiment, the resulting event classification can then be provided to a user interface or other high-level process. As discussed above, the event classification scores can be utilized to perform various post-classification actions including at least one of providing an alert message to a user via a user interface, automatically performing subsequent actions (e.g., shutting down a machine, flashing a light, tripping a relay, ringing a bell, sending an email, sending an SMS), and logging the event classification (e.g., in a database, or other electronic data storage area). In an embodiment, these actions are associated with a respective class model or otherwise retrievable after a classification is determined. In addition, one or more visual representations of the event classifications may be provided to a user including, for instance, an indication of the highest probability event class (e.g., a human-readable description or image) as well as a number of other high-probability event classifications (e.g., in a descending order from highest probability to lowest).

In an embodiment, supplemental data regarding the one or more event classifications may also be provided by an alert message via a user interface. Some such supplemental data may be metadata including, for instance, a so-called "plain English" name of the object within a scene from which a sound is emanating, instructions to perform an operation on a target machine (e.g., a repair or other maintenance), user-defined notes/label, manuals, blueprints, pictures of a particular machine (e.g., including cut-away views, 3-D models), a service tag for a machine (e.g., its identification number), a GPS location (geo-location), date of detection, time of detection, a building identifier, a phone number to call, an email address to notify, and a text description of the detected event classification, just to name a few. Alternatively, or in addition to the metadata, supplemental data may be audio and video data including, for example, sound samples from the event, video/images from the observed scene (e.g., augmented reality with or without event indicators overlaid onto images), or any portion or combination of the acoustic image data, audio frames, and image frames of an observed scene, with or without metadata overlays.

FIG. 5C depicts one such example image frame output by the event classification module 408, in accordance with an embodiment of the present disclosure. As shown, the resulting image is depicted with two events (e.g., Event 1 and Event 2 of FIG. 5B) and event labels (Solenoid and Piston). In an embodiment, images such as the example image depicted in FIG. 5C can be rendered and presented on a display of an electronic device (e.g., a smart phone, laptop, or other device with a display). In this embodiment, the electronic device may present a plurality of these images in an augmented reality mode whereby the display presents real-time images of the observed scene with an overlay depicting an acoustic heat map and/or the metadata for the event. Note that the rectangular mask 413 can be colored in a manner that suggests whether a determined event is considered normal, or abnormal. For instance, in FIG. 5C the solenoid location can be framed in a green rectangle, and the label can also be green, thus indicating normal operation (e.g., a noise, but the noise being classified as a normal operation of the machine). Conversely, the piston location can be framed in a red rectangle with the label for the event ("Piston") also being red, thus indicating an abnormal operation (e.g., a potential fault occurring in the machine). Numerous other such color coding schemes can be used, as will be appreciated. Although the event regions are depicted as rectangles, it should be appreciated that no such rectangle or similar frame may be shown. Likewise, it should be appreciated that the depicted shape is not limited to rectangle and could be, for example, a square, a circle and or a trapezoids. In addition, shapes for abnormal sound regions may be different than shapes for normal sound regions. Also, in some cases, different types of highlights (e.g., colors, images, symbols), and animations (e.g., blinking text, flashing symbols, and other effects) may be utilized to denote event regions. In addition, it should be appreciated that sound may accompany these images (e.g., by a speaker of a device implementing the acoustic monitoring system 100) such as, for example, an aural presentation of the condition including a pre-recorded expression (e.g., "Abnormal state detected in Solenoid X; maintenance may be required."). In an embodiment, these images can be displayed statically or displayed to a user in an augmented reality mode whereby one or more images of an observed scene include an acoustic heat map and metadata overlay.

Example Use Cases

As discussed above with regard to FIG. 1, numerous additional applications for the scene analysis techniques disclosed herein should be apparent in light of this disclosure. One such example includes scene analysis in urban or otherwise high-traffic areas. In this example, events may be detected such as, for instance, car crash, flooding, explosions, windows breaking (e.g., robbery) or other a-typical events that can indicate that the services of police, fire and emergency medical services (EMS) may be necessary. In an embodiment, detection of an event can result in a location being transmitted to such first-responders along with any associated metadata for the event. In addition, in some applications it may be essential to count a number of vehicles entering a scene, and in some cases, to also identify whether the vehicle is a car or truck. To this end, the distinctive sounds a car makes versus a truck can be modeled and utilized to perform such analysis. Other such applications will be apparent in light of this disclosure.

Another such example is in military environments including battle fields. In these environments, potential enemy positions can be localized and classified by sounds they emit. Some such example sounds could be the fire of an enemy weapon (e.g., distinctive chatter of an AK-47), the thud of a mortar round being dropped into a tube, voices (e.g., including those speaking a particular language, differentiating an adult voice from a child, distinguishing the voice of a man from a woman, detecting a particular language spoken), and any other sound indicative of enemy/friendly activity. In an embodiment, the enemy position (and classification description) can be presented as a rectangle or other highlight overlaid on to real time video of the battlefield. In this embodiment, these overlaid images can be presented in an augmented reality mode on a display such as, for example, a heads-up display in a helmet, a land-based vehicle, an aircraft, or other military vehicle that, for example, observes a field of battle.

Still another such example is in the home environment. In this environment, sounds can be detected and classified to determine if a robbery is occurring (e.g., based on the breaking of class, a door being broken or other similar home-invasion noises). Other noises of this environment may also be useful for classification purposes and can include, for example, water flooding, smoke alarm ringing, sounds of fire, just to name a few.

Still yet another example is in the field of disaster recovery in a disaster zone. In this environment, the use of sound to recognize objects in a disaster zone can be advantageous for discovering trapped victims, identifying gas leaks, burst pipes, pings from a first-responders "man-down" device (e.g., that emits a sound when the first-responder is determined to be horizontal). Numerous variations will be apparent in light of this disclosure and these provided example environments are not intended to be limiting.

Distributed Scene Analysis System

Figure 6:
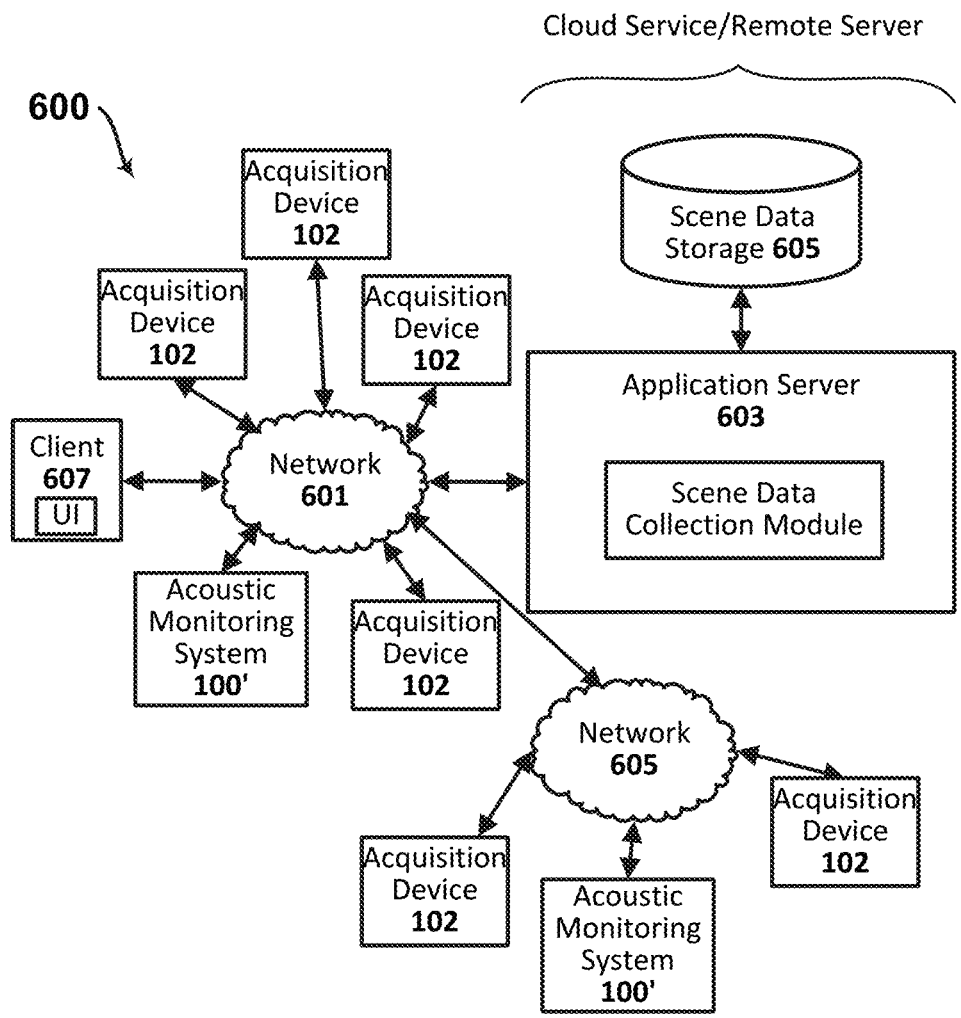
FIG. 6 illustrates a distributed acoustic monitoring system configured in accordance with an embodiment of the present disclosure.

FIG. 6 illustrates a distributed acoustic monitoring system 600 configured in accordance with an embodiment of the present disclosure. As can be seen, the system includes a plurality of data acquisition devices 102 communicatively coupled to a network 601. In addition, the system includes one or more acoustic monitoring systems 100' communicatively coupled to the network 601 and network 605, respectively. In an embodiment, each acoustic monitoring system 100' can comprise a separate implementation of the acoustic monitoring system 100 of FIG. 1. In this embodiment, each acoustic monitoring system 100' can be a standalone system (e.g., having the data acquisition devices 102, acoustic image controller 108, image controller 110, and the CAV controller 112), or be distributed such that one or more remote data acquisition devices 102 provide audio/video scene data. In addition, each acoustic monitoring system 100' can be a hybrid system having stand-alone qualities (self-contained system having one or more acquisition devices) and also receive a portion of audio/video data from one or more remote acquisition devices 102. To this end, the acoustic monitoring system 100' can perform acoustic monitoring at or near real-time and/or perform prospective analysis (e.g., on previously captured scene data) in a stand-alone or distributed fashion.

As shown, the distributed acoustic monitoring system 600 can include two or more networks (601 and 605) each comprising an acoustic monitoring device and a number of acquisition devices. Note that the distributed acoustic monitoring system 600 is not limited to a particular number of networks, or acoustic monitoring systems/acquisition devices within those networks. To this end, the network arrangement shown in FIG. 6 should not be considered limiting. As shown, the two networks 601 and 605 can enable coordinated data acquisition and acoustic monitoring processes. For example, the acoustic monitoring system 100' of network 601 can remotely access scene data from any of acquisition devices 102 in network 605. Likewise, the acoustic monitoring system 100' of network 605 can access scene data from any of the data acquisition devices 102 in network 601. In any event, it should be appreciated that such an arrangement enables some acoustic monitoring systems to analyze scene data to detect and classify a first type of sound event, while the other acoustic monitoring systems can detect and classify a second type of sound event from at least one of the same scene, a same scene from a different angle, and a different scene (e.g., for monitoring or training purposes). As will be appreciated, this can be particularly advantageous when, for example, a divide-and-conquer approach is utilized to balance the workload of computationally expensive scene analysis. Likewise, it should be appreciated that data from different scenes (e.g., remote scenes, different angles) can be useful for training and machine learning. For example, a newly deployed monitoring system can benefit from other monitoring systems by having access to their scene data, models, and prior classifications. In addition, it should be further appreciated that the acoustic monitoring system 100' of each of the networks 601 and 603, respectively, can utilize data from the data acquisition devices 102 to perform on-going training routines, and not just when first deployed.

In an embodiment, an application server 603 capable of executing a scene data collection module is configured to access the various data acquisition devices 102 to obtain acoustic images, image data and audio samples from each. Note, additional application servers 603 could be implemented (e.g., in network 601 and/or in network 605) and the embodiment shown in FIG. 6 should not be viewed as limiting the present disclosure. Scene data received by the server 603 can be stored in scene data storage 605. As discussed above, scene analysis can be performed at or near real-time, or in a prospective mode. To this end, the acoustic monitoring systems 100' of network 601 and 603, respectively, can access one or more of the data acquisition devices 102 to receive a real-time stream (e.g., real-time transport protocol (RTP)) of scene data. Alternatively, or in addition to accessing acquisition devices, the one or more acoustic monitoring systems 100' can access stored scene data within the scene data store 605 via an application programming interface (API) or other suitable means of communicating with the application server 603 to retrieve such data. Likewise, one or more client computing systems 607 may also be able to access one or more of the acoustic monitoring systems 100' or data acquisition devices 102 (e.g., by way of a subscription to a cloud-based condition monitoring system or some other authorized usage).

The network 601 can be any communication network or combination of networks, such as the Internet and one or more local access networks. Wireless and wired network technologies can be used, as will be appreciated. While only one client 607 and one server 603 are shown, it will be appreciated that any number of clients 607 and servers 603 may be included in the system, as needed. Each client 607 and server 603 can be implemented with any suitable computing architecture, as commonly done, and programmed or otherwise configured to execute scene collection from the distributed acoustic monitoring system. The server(s) 603 can be, for example, part of a cloud-based sensing system, such as an industrial condition monitoring system that has acoustic camera devices deployed in various positions and/or other locations around a production facility, so that users (e.g., technicians, managers, and other personnel) can access the system to determine if target scenes (e.g., one or more machines) are operating in a normal or otherwise as-expected manner. The user interface (UI) of the client computing system 607 may present images, for example, similar to the ones shown in FIG. 5A, FIG. 5B and FIG. 5C, although any number of suitable UI schemes can be used. For instance, additional supplemental data related to detected events may be presented including, for example, machine schematics, manuals, maintenance procedures, cutaway views of the inner workings of a machine, or any other data that can assist in post-detection actions. As will be further appreciated, similar UI schemes can also be used with respect to the application server 603 and to provide access to the storage 605, for both writing data to that storage and reading data from that storage.

Such an embodiment may be implemented, for example, in the context of a so-called Internet of Things (IoT) configuration to provide the one or more acoustic monitoring systems 100 and data acquisition devices 102. Further note that in such an IoT system, such devices could be included in a fixed-position node deployed at a particular location (e.g., surveillance cameras, CCTV cameras). To this end, the acoustic monitoring system 100 and data acquisition devices 102 need not be mobile. Further note that the acoustic monitoring systems 100 and acquisition devices can be addressable like any other computing system on a given network, such as by a given IP address, MAC address, and/or any other suitable addressing mechanism by which an element on a given network can be accessed. Numerous variations and embodiments employing a distributed sensing system will be apparent in light of this disclosure.

Example System

Figure 7:
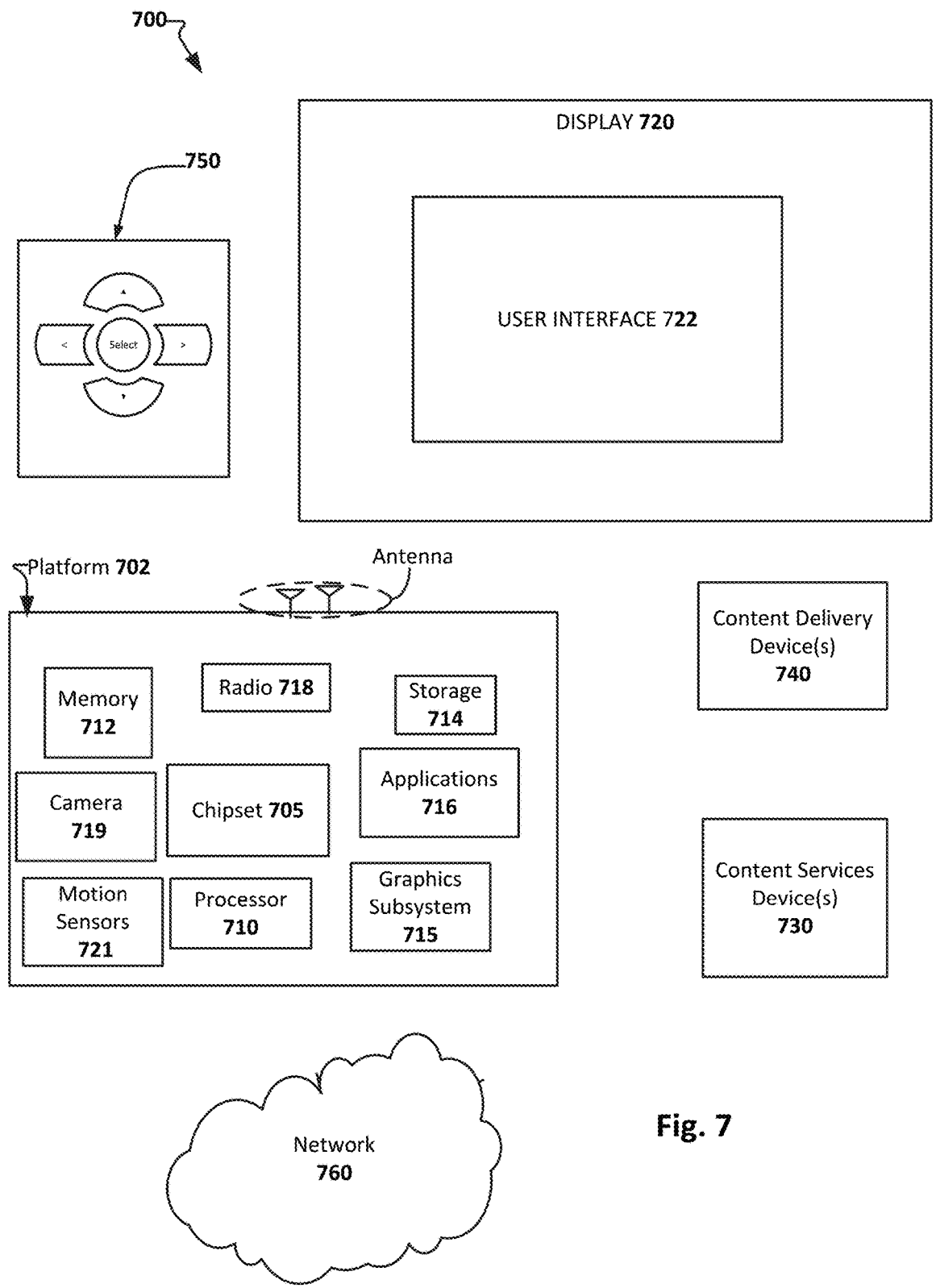
FIG. 7 illustrates a computer system configured with scene analysis techniques disclosed herein, in accordance with an example embodiment of the present disclosure.

FIG. 7 illustrates a computing system 700 implemented with an acoustic monitoring system using the techniques disclosed herein, in accordance with various example embodiments. In some embodiments, system 700 may be a system for capturing and/or displaying still or moving images via a camera (not shown) although system 700 is not limited to this context. For example, system 700 may be incorporated into a personal computer (PC), laptop computer, wearable computing device, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720, so as to supplement navigational gesturing by the user. Each of these example components is described in more detail below.

In some embodiments, platform 702 may comprise any combination of a chipset 705, processor 710, memory 712, storage 714, graphics subsystem 715, camera 719, motion sensors 721, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 710 may comprise dual-core processor(s), dual-core mobile processor(s), and so forth. Memory 712 may be implemented, for instance, as a volatile memory device such as, but not limited to, a Random Access Memory (RAM), Dynamic Random Access Memory (DRAM), or Static RAM (SRAM). Storage 714 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 714 may comprise technology to increase the storage performance enhanced protection for valuable digital media when multiple hard drives are included, for example.

Graphics subsystem 715 may perform processing of images such as still or video for display, and in some embodiments is configured to synthesize face images, as variously described herein. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705. The graphics and/or video processing techniques, including the techniques for identifying and producing preferred face orientations described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In some embodiments, content services device(s) 730 may be hosted by any national, international and/or independent service and thus accessible to platform 702 via the Internet or other network, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720. In some embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, graphics, text, medical and gaming content, and so forth.

Content services device(s) 730 receives content such as cable television programming including media information, digital information, and/or other content. Examples of content providers may include any cable or satellite television or radio or Internet content providers. The provided examples are not meant to limit the present disclosure. In some embodiments, platform 702 may receive control signals from navigation controller 750 having one or more navigation features. The navigation features of controller 750 may be used to interact with user interface 722, for example. In some embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In some embodiments, controller 750 may not be a separate component but integrated into platform 702 and/or display 720. Embodiments, however, are not limited to the elements or in the context shown or described herein, as will be appreciated.

In some embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off" In addition, chipset 705 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, images (e.g., selfies, etc.), video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 7.

Figure 8:
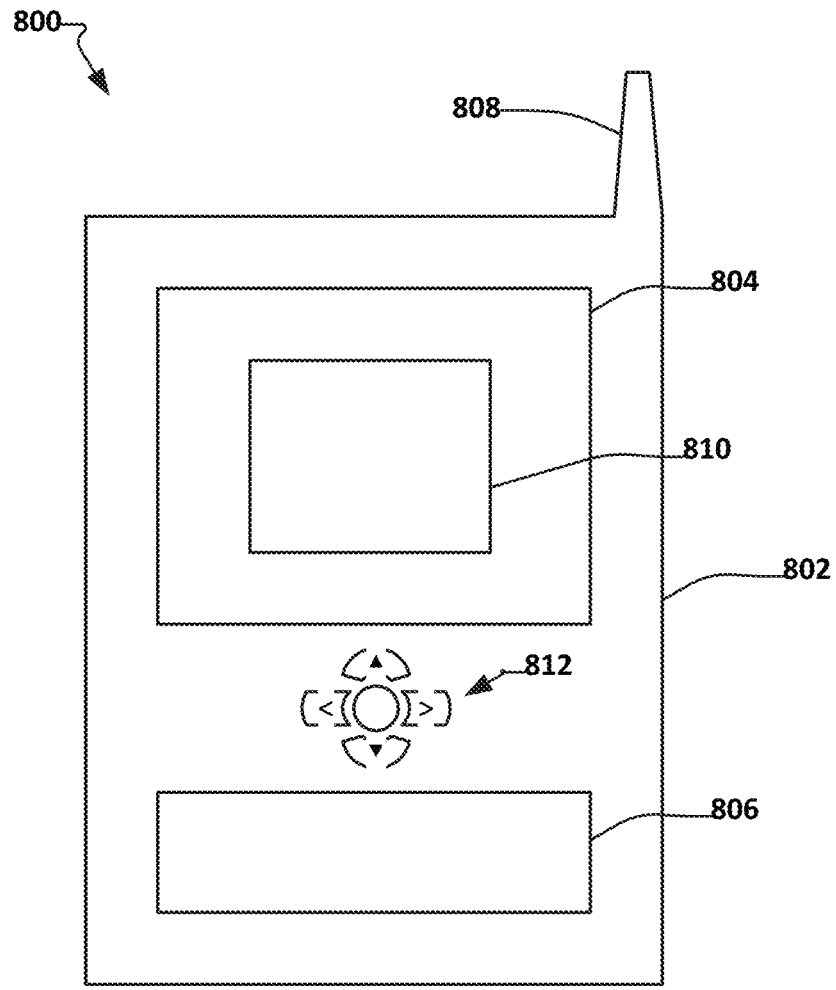
FIG. 8 shows a mobile computing system configured in accordance with an embodiment of the present disclosure.

As described above, system 700 may be embodied in varying physical styles or form factors. FIG. 8 illustrates embodiments of a small form factor device 800 in which system 700 may be embodied. In some embodiments, for example, device 800 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, mobile electronic device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device, which in one example embodiment is a touchscreen display. I/O device 806 may comprise any suitable I/O device for entering information into a mobile computing device. Examples for I/O device 806 may include an alphanumeric keyboard, a numeric keypad, a touch pad, input keys, buttons, a camera, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, systems on-chip, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Example Embodiments

The following examples pertain to further embodiments, from which numerous permutations and configurations will be apparent.

Example 1 is an acoustic monitoring system comprising an array of microphone devices, an acoustic image controller communicatively coupled to the array of microphone devices and configured to output acoustic image data based on a plurality of audio signals received from the array of microphone devices, and a computer audio vision (CAV) controller communicatively coupled to the acoustic image controller and including an event recognition mode configured to analyze at least a portion of the acoustic image data to detect one or more sound events within an observed scene, and to determine at least one condition causing the one or more sound events.

Example 2 includes the subject matter of Example 1, where the CAV controller is further configured to generate, in response to detecting one or more sound events, a multi-dimensional event signature for each respective sound event, and where each multi-dimensional event signature includes at least a portion of the acoustic image data and a set of spatially filtered sound signals based on the plurality of audio signals.

Example 3 includes the subject matter of Example 2, where the CAV controller is further configured to correlate a position of the one or more sound events to a corresponding portion of image frames captured by a visual image sensor.

Example 4 includes the subject matter of Example 3, where the CAV controller is further configured to extract a first set of visual features from a correlated region of one or more acoustic image frames for each respective sound event of the one or more sound events, extract a second set of visual features from a correlated region of one or more image frames for each respective sound event of the one or more sound events; and extract audio features from the spatially filtered sound signals for each respective sound event of the one or more sound events.

Example 5 includes the subject matter of Example 4, where the CAV controller is further configured to, for each respective sound event of the one or more sound events, score the multi-dimensional event signature against one or more predefined event class models, and classify a condition causing at least one sound event of the one or more events based on the one or more scored event class models.

Example 6 includes the subject matter of Examples 1-5, where each microphone device of the array of microphone devices comprises an omnidirectional frequency response.

Example 7 includes the subject matter of Examples 1-5, where each microphone device of the array of microphone devices comprises at least one of a unidirectional, a bi-directional, a shotgun, a contact and a parabolic microphone type.

Example 8 includes the subject matter of Examples 1-7, where each microphone device of the array of microphone devices includes an identical frequency response and sensitivity.

Example 9 includes the subject matter of Examples 1-8, where a first subset of the array of microphone devices includes microphone devices with a first frequency response and a second subset includes microphone devices with a second frequency response.

Example 10 includes the subject matter of Example 9, where at least one of the first subset and the second subset include a targeted frequency response.

Example 11 includes the subject matter of Examples 1-10, where the array of microphone devices comprises a 2-D array, the 2-D array including an M×N pattern of microphones.

Example 12 includes subject matter of Examples 1-11, where the array of microphone devices comprise a broadside array.

Example 13 includes the subject matter of Examples 1-12, further comprising a visual image sensor.

Example 14 includes the subject matter of Example 13, where the visual image sensor is positioned in a center of the array of microphone devices.

Example 15 includes the subject matter of Examples 13-14, where the visual image sensor is configured to produce an RGB image stream.

Example 16 includes the subject matter of Examples 13-15, where the visual image sensor comprises an infrared image sensor.

Example 17 includes the subject matter of Examples 13-16, where the visual image sensor and the array of microphone devices each have a capture domain and are configured such that the capture domains are spatially aligned with one another.

Example 18 includes the subject matter of Examples 13-17, where image data output by the visual image sensor and the plurality of audio signals output by the array of microphones is temporally aligned based on a common clock scheme.

Example 19 includes the subject matter of Examples 1-18, further comprising a processor configured to issue an alert in response to the CAV controller detecting at least one sound event in an observed scene and determining a condition causing the at least one sound event.

Example 20 includes the subject matter of Example 19, further comprising at least one of a display to visually present the alert. a haptic element to present the alert, and a speaker to aurally present the alert.

Example 21 includes the subject matter of Example 20, where the display is a touch screen display.

Example 22 includes the subject matter of Examples 1-21, further comprising a user interface configured to present sound event information in response to at least one sound event detected within the observed scene.

Example 23 includes the subject matter of Example 22, where the user interface provides an augmented reality presentation such that sound event information is overlaid on to one or more visual images of the observed scene.

Example 24 includes the subject matter of Example 23, where the augmented reality presentation further comprises a semi-transparent acoustic heat map overlaid on to the one or more images of the observed scene.

Example 25 includes the subject matter of Examples 22-24, where the sound event information includes at least one of an object identifier, a user-defined label, and a geo-location identifier.

Example 26 is a system-on-chip (SOC) comprising the system as defined in any of the preceding examples.

Example 27 is a mobile computing device comprising the system of any of the preceding examples.

Example 28 includes the subject matter of Example 27, where the mobile computing device is one of a wearable device, a smartphone, a tablet, or a laptop computer.

Example 29 is at least one non-transient computer program product encoded with instructions that when executed by one or more processors cause a process to be carried out, the process comprising receiving a plurality of acoustic image frames and a plurality of spatially filtered sound signals from an acoustic imaging controller, the plurality of acoustic image frames and the plurality of spatially filtered sound signals representing a spatial spectrum of an observed scene, determining a position of one or more sound events within the plurality of acoustic image frames, and generating, in response to determining the position of one or more sound events, a multi-dimensional event signature for each respective sound event, where each multi-dimensional event signature includes at least a portion of the acoustic image frames and a set of spatially filtered sound signals from the plurality of spatially filtered sound signals.

Example 30 includes the subject matter of Example 29, the process further comprising receiving a plurality of image frames representing the observed scene.

Example 31 includes the subject matter of Example 30, where the plurality of acoustic image frames, the plurality of spatially filtered sound signals, and the plurality of image frames are spatially and temporally aligned.

Example 32 includes the subject matter of Examples 29-31, where the act of determining the position of one or more sound events further comprises utilizing a peak-picking algorithm on delta images, the delta images being generated from the plurality of acoustic image frames, where only those pixels within the delta images having pixel intensities exceeding a predefined threshold are registered as a sound event.

Example 33 includes the subject matter of Example 32, where the position for each sound event of the one or more sound events is correlated to a geometric region of those pixels of acoustic image data exceeding the predefined threshold.

Example 34 includes the subject matter of Examples 30-33, the process further comprising correlating the position of the one or more sound events to a corresponding portion of image frames.

Example 35 includes the subject matter of Examples 29-34, further comprising summing the set of spatially filtered sound signals for each respective sound event of the one or more sound events.

Example 36 includes the subject matter of Example 35, the process further comprising extracting a first set of visual features from a correlated region of one or more acoustic image frames for each respective sound event of the one or more sound events, extracting a second set of visual features from a correlated region of one or more image frames for each respective sound event of the one or more sound events, and extracting audio features from the summed spatially filtered sound signals for each respective sound event of the one or more sound events.

Example 37 includes the subject matter of Example 36, where extracting the first set of visual features and the second set of visual features further includes utilizing a scale invariant feature transform (SIFT).

Example 38 includes the subject matter of Examples 36-37, where extracting audio features from the summed spatially filtered sound signals for each respective sound event of the one or more sound events further includes utilizing Mel-frequency Cepstral coefficients (MFCCs).

Example 39 includes the subject matter of Examples 36-38, where the generated multi-dimensional event signature for each respective sound event includes at least a portion of the first set of extracted visual features, a portion of the second set of extracted visual features, and a portion of the extracted audio features.

Example 40 includes the subject matter of Example 29-39, the process further comprising for each respective sound event of the one or more sound events, scoring the multi-dimensional event signature against one or more predefined event class models, and classifying a condition causing at least one sound event of the one or more sound events based on the one or more scored event class models.

Example 41 includes the subject matter of Example 40, where the one or more predefined event class models each comprise a Gaussian Mixture Model (GMM).

Example 42 includes the subject matter of Examples 40-41, where the one or more predefined event class models are determined a priori.

Example 43 includes the subject matter of Examples 40-42, where the one or more predefined event class models are generated through a training routine.

Example 44 includes the subject matter of Examples 40-43, the process further comprising presenting one or more alerts to a user based on each classified condition for the one or more sound events.

Example 45 includes the subject matter of Example 44, where the one or more alerts are presented visually via a display screen.

Example 46 includes the subject matter of Examples 44-45, where the one or more alerts are presented aurally via a speaker.

Example 47 includes the subject matter of Examples 44-46, where the process further comprises logging the one or more alerts and supplemental data for each sound event of the one or more sound events in a database.

Example 48 includes the subject matter of Example 47, where the supplemental data comprises at least one of date of detection, time of detection, geo-location of detection, a description of the classified condition, and an object identifier or label from which each respective sound event of the one or more sound events is emanating from.

Example 49 is a computer-implemented method for condition monitoring, the method comprising receiving, by a processor, a plurality of acoustic image frames and a plurality of spatially filtered sound signals, the plurality of acoustic image frames and the plurality of spatially filtered sound signals representing a spatial spectrum of an observed scene, determining a position of one or more sound events within the plurality of acoustic image frames, and generating, in response to determining the position of one or more sound events, a multi-dimensional event signature for each respective sound event, where each multi-dimensional event signature includes at least a portion of the acoustic image frames and a set of spatially filtered sound signals from the plurality of spatially filtered sound signals.

Example 50 includes the subject matter of Example 49, further comprising for each respective sound event of the one or more sound events, scoring the multi-dimensional event signature against one or more predefined event class models, classifying a condition causing at least one sound event of the one or more sound events based on the one or more scored predefined event class models, and displaying a user interface visually representing sound event information in response to classifying a condition causing each respective sound event of the one or more sound events.

29

Example 51 includes the subject matter of Example 50, where displaying the user interface depicting sound event information further comprises displaying one or more frames of image data in an augmented reality mode, where the sound event information is overlaid on the one or more frames of image data at a position from which each respective sound event of the one or more sound events is emanating.

Example 52 includes the subject matter of Example 51, where the augmented reality mode further comprises displaying a semi-transparent acoustic heat map that represents relative intensity and position of each respective sound event of the one or more sound events.

Example 53 includes the subject matter of Examples 49-52, where receiving the plurality of acoustic image frames and the plurality of spatially filtered sound signals further comprises receiving at least a portion of the plurality of acoustic image frames and the plurality of spatially filtered sound signals from a remote storage server.

Example 54 includes the subject matter of Examples 49-53, the method further comprising receiving at least one new or updated predefined event class model.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An acoustic monitoring system, comprising:
   an array of microphone devices;
   an acoustic image controller communicatively coupled to the array of microphone devices and configured to output acoustic image data based on a plurality of audio signals received from the array of microphone devices, the acoustic image data comprising a 2-dimensional grid of pixels wherein intensity of each pixel represents sound intensity from a unique angle of arrival; and
   a computer audio vision (CAV) controller communicatively coupled to the acoustic image controller and including an event recognition mode and configured to analyze at least a portion of the acoustic image data to detect one or more sound events within an observed scene, and to determine at least one condition causing the one or more sound events,
   generate, in response to detecting one or more sound events, a multi-dimensional event signature for each respective sound event, each multi-dimensional event signature includes at least a portion of the acoustic image data and a set of spatially filtered sound signals based on the plurality of audio signals,
   for each respective sound event of the one or more sound events, score the multi-dimensional event signature against one or more predefined event class models, and
   classify a condition causing at least one sound event of the one or more events based on the one or more scored event class models.

2. The system of claim 1, wherein the CAV controller is further configured to correlate a position of the one or more sound events to a corresponding portion of image frames captured by a visual image sensor.

3. The system of claim 2, wherein the CAV controller is further configured to:
   extract a first set of visual features from a correlated region of one or more acoustic image frames for each respective sound event of the one or more sound events;
   extract a second set of visual features from a correlated region of one or more image frames for each respective sound event of the one or more sound events; and
   extract audio features from the spatially filtered sound signals for each respective sound event of the one or more sound events.

4. The system of claim 1, wherein each microphone device of the array of microphone devices comprises at least one of a unidirectional, a bi-directional, a shotgun, a contact and a parabolic microphone type.

5. The system of claim 1, further comprising:
   a user interface configured to present sound event information in response to at least one sound event detected within the observed scene, wherein the user interface provides an augmented reality presentation such that sound event information is overlaid on to one or more visual images of the observed scene, and wherein the augmented reality presentation further comprises a semi-transparent acoustic heat map overlaid on to the one or more images of the observed scene.

6. The system of claim 5, wherein the sound event information includes at least one of an object identifier, a user-defined label, and a geo-location identifier.

7. A system-on-chip (SOC) comprising the system of claim 1.

8. A mobile computing device comprising the system of claim 1, wherein the mobile computing device comprises a wearable device, a smartphone, a tablet, or a laptop computer.

9. At least one non-transitory computer program product encoded with instructions that when executed by one or more processors cause a process to be carried out, the process comprising:
   receiving a plurality of acoustic image frames and a plurality of spatially filtered sound signals from an acoustic imaging controller, the plurality of acoustic image frames and the plurality of spatially filtered sound signals representing a spatial spectrum of an observed scene, the acoustic image frame comprising a 2-dimensional grid of pixels wherein intensity of each pixel represents sound intensity from a unique angle of arrival;
   determining a position of one or more sound events within the plurality of acoustic image frames;
   generating, in response to determining the position of one or more sound events, a multi-dimensional event signature for each respective sound event, wherein each multi-dimensional event signature includes at least a portion of the acoustic image frames and a set of spatially filtered sound signals from the plurality of spatially filtered sound signals;
   for each respective sound event of the one or more sound events, scoring the multi-dimensional event signature against one or more predefined event class models; and
   classifying a condition causing at least one sound event of the one or more sound events based on the one or more scored event class models.

10. The computer program product of claim 9, the process further comprising receiving a plurality of image frames representing the observed scene.

11. The computer program product of claim 9, wherein the act of determining the position of one or more sound events further comprises utilizing a peak-picking algorithm on delta images, the delta images being generated from the plurality of acoustic image frames, wherein only those pixels within the delta images having pixel intensities exceeding a predefined threshold are registered as a sound event.

12. The computer program product of claim 11, wherein the position for each sound event of the one or more sound events is correlated to a geometric region of those pixels of acoustic image data exceeding the predefined threshold.

13. The computer program product of claim 12, the process further comprising correlating the position of the one or more sound events to a corresponding portion of image frames.

14. The computer program product of claim 13, further comprising summing the set of spatially filtered sound signals for each respective sound event of the one or more sound events.

15. The computer program product of claim 14, the process further comprising:
 extracting a first set of visual features from a correlated region of one or more acoustic image frames for each respective sound event of the one or more sound events;
 extracting a second set of visual features from a correlated region of one or more image frames for each respective sound event of the one or more sound events; and
 extracting audio features from the summed spatially filtered sound signals for each respective sound event of the one or more sound events.

16. The computer program product of claim 15, wherein the generated multi-dimensional event signature for each respective sound event includes at least a portion of the first set of extracted visual features, a portion of the second set of extracted visual features, and a portion of the extracted audio features.

17. The computer program product of claim 1, wherein the one or more predefined event class models each comprise a Gaussian Mixture Model (GMM).

18. A method for condition monitoring, the method comprising:
 receiving, by a processor, a plurality of acoustic image frames and a plurality of spatially filtered sound signals, the plurality of acoustic image frames and the plurality of spatially filtered sound signals representing a spatial spectrum of an observed scene, the acoustic image frame comprising a 2-dimensional grid of pixels wherein intensity of each pixel represents sound intensity from a unique angle of arrival;
 determining a position of one or more sound events within the plurality of acoustic image frames;
 generating, in response to determining the position of one or more sound events, a multi-dimensional event signature for each respective sound event, wherein each multi-dimensional event signature includes at least a portion of the acoustic image frames and a set of spatially filtered sound signals from the plurality of spatially filtered sound signals;
 for each respective sound event of the one or more sound events, scoring the multi-dimensional event signature against one or more predefined event class models; and
 classifying a condition causing at least one sound event of the one or more sound events based on the one or more scored event class models.

19. The method of claim 18, further comprising:
 displaying a user interface visually representing sound event information in response to classifying a condition causing each respective sound event of the one or more sound events.

20. The method of claim 19, wherein displaying the user interface depicting sound event information further comprises displaying one or more frames of image data in an augmented reality mode, wherein the sound event information is overlaid on the one or more frames of image data at a position from which each respective sound event of the one or more sound events is emanating.

21. The method of claim 18, wherein receiving the plurality of acoustic image frames and the plurality of spatially filtered sound signals further comprises receiving at least a portion of the plurality of acoustic image frames and the plurality of spatially filtered sound signals from a remote storage server.

22. The method of claim 18, the method further comprising receiving at least one new or updated predefined event class model.

* * * * *